United States Patent
Kitsunai et al.

(10) Patent No.: US 7,957,933 B2
(45) Date of Patent: Jun. 7, 2011

(54) PERFORMANCE MONITOR DEVICE AND INFORMATION PROCESSING APPARATUS

(75) Inventors: Kazuya Kitsunai, Kawasaki (JP); Seiji Maeda, Kawasaki (JP); Hidenori Matsuzaki, Kawasaki (JP); Yusuke Shirota, Fuchu (JP)

(73) Assignee: Kabushiki Kaisha Toshiba, Tokyo (JP)

(*) Notice: Subject to any disclaimer, the term of this patent is extended or adjusted under 35 U.S.C. 154(b) by 377 days.

(21) Appl. No.: 11/892,501

(22) Filed: Aug. 23, 2007

(65) Prior Publication Data

US 2008/0183430 A1 Jul. 31, 2008

(30) Foreign Application Priority Data

Jan. 26, 2007 (JP) .................. P2007-016763

(51) Int. Cl.
*G06F 11/30* (2006.01)
(52) U.S. Cl. ...................................... 702/182
(58) Field of Classification Search .............. 702/73–75, 702/78–80, 122, 126, 129, 176, 177, 179, 702/182, 194; 714/45; 712/227; 711/118, 140, 202, 218–221

See application file for complete search history.

(56) References Cited

U.S. PATENT DOCUMENTS

| | | | |
|---|---|---|---|
| 6,145,123 A | 11/2000 | Torrey et al. | 717/128 |
| 6,374,367 B1 | 4/2002 | Dean et al. | 714/37 |
| 6,918,065 B1 | 7/2005 | Edwards et al. | 714/45 |
| 2004/0123084 A1* | 6/2004 | DeWitt et al. | 712/227 |

FOREIGN PATENT DOCUMENTS

JP 2001-142747 5/2001

* cited by examiner

*Primary Examiner* — Mohamed Charioui
(74) *Attorney, Agent, or Firm* — Nixon & Vanderhye, PC

(57) ABSTRACT

An information processing apparatus includes a receptor for receiving an event signal occurring in hardware during program execution in time series, a feature event counter for counting the number of occurrences of a feature event to determine the feature of the program, a stored event counter for counting the number of occurrences of stored event determined from the feature event with the maximum number of occurrences, and a storage for storing the count result of the number of occurrences of the stored event.

22 Claims, 13 Drawing Sheets

PERFORMANCE MONITOR DEVICE AND INFORMATION PROCESSING APPARATUS

RELATED APPLICATION(S)

The present disclosure relates to the subject matter contained in Japanese Patent Application No. 2007-016763 filed on Jan. 26, 2007, which is incorporated herein by reference in its entirety.

FIELD

The present invention relates to a performance monitor device and an information processing apparatus that is provided with the performance monitor device.

BACKGROUND

A performance monitor device is widely used for analyzing performance of a software program. The performance monitor device stores an event occurring in hardware during program execution to be used for performance analysis. However, it would not be reasonable to store all of the events occurring during the execution of the program from the viewpoint of the hardware cost. Therefore, the operator of the performance monitor device needs to select and set the events to be stored. Thus, an event not involved in performance analysis of a program is also stored depending on the setup event and the analysis time is increased.

In order to solve such problem, there is proposed a performance monitor device that enables the operator to select the event to be stored in transaction units of event groups occurring in a processing sequence for an instruction from a processor. For example, refer to JP-A-11-272519 (counterpart U.S. patent application is granted as U.S. Pat. No. 6,374,367 B1).

It is desirable that the performance monitor device should store an event having a large effect on evaluation of program performance. However, in the technique disclosed in JP-A-11-272519, although the event to be stored can be set in transaction units, an event not involved in evaluation of program performance is also stored depending on the transaction setting and the analysis time is increased.

During program execution, it is difficult to change the event to be stored in response to a behavior of the program.

SUMMARY

According to a first aspect of the invention, there is provided a performance monitor device including: a feature event extraction unit that extracts one or more feature events from event signal that is received in time series, the event signal configured by a plurality of bits indicating one or different types of events occurring in a hardware during execution of a software program; a feature selection unit that: (A) receives (1) at least a part of an address signal that indicates an instruction address of the software program being executed and (2) the feature events extracted by the feature event extraction unit; (B) counts and updates a number of occurrences of each of the feature events corresponding to the address signal; and (C) outputs one of the feature events as a feature identifier that identifies a feature of the software program; a stored event extraction unit that: (A) receives the event signal; (B) selects a plurality of stored event candidates from the events indicated in the event signal based on a plurality of internally stored event numbers; and (C) outputs one of the stored event candidates as a stored event based on the feature identifier; and an event storage control unit that: (A) receives (1) the stored event output from the stored event extraction unit and (2) the address signal received by the feature selection unit; and (B) counts and updates a number of occurrences of the stored event corresponding to the address signal.

According to a second aspect of the invention, there is provided an information processing apparatus including: a performance monitor device according to the first aspect; and a processor core that outputs the address signal and the event signal to the performance monitor, the processor core having a computation unit and a primary cache memory unit.

DETAILED DESCRIPTION OF THE EMBODIMENTS

Referring now to the accompanying drawings, an embodiment of the present invention will be described in detail.

First Embodiment

Figure 1:
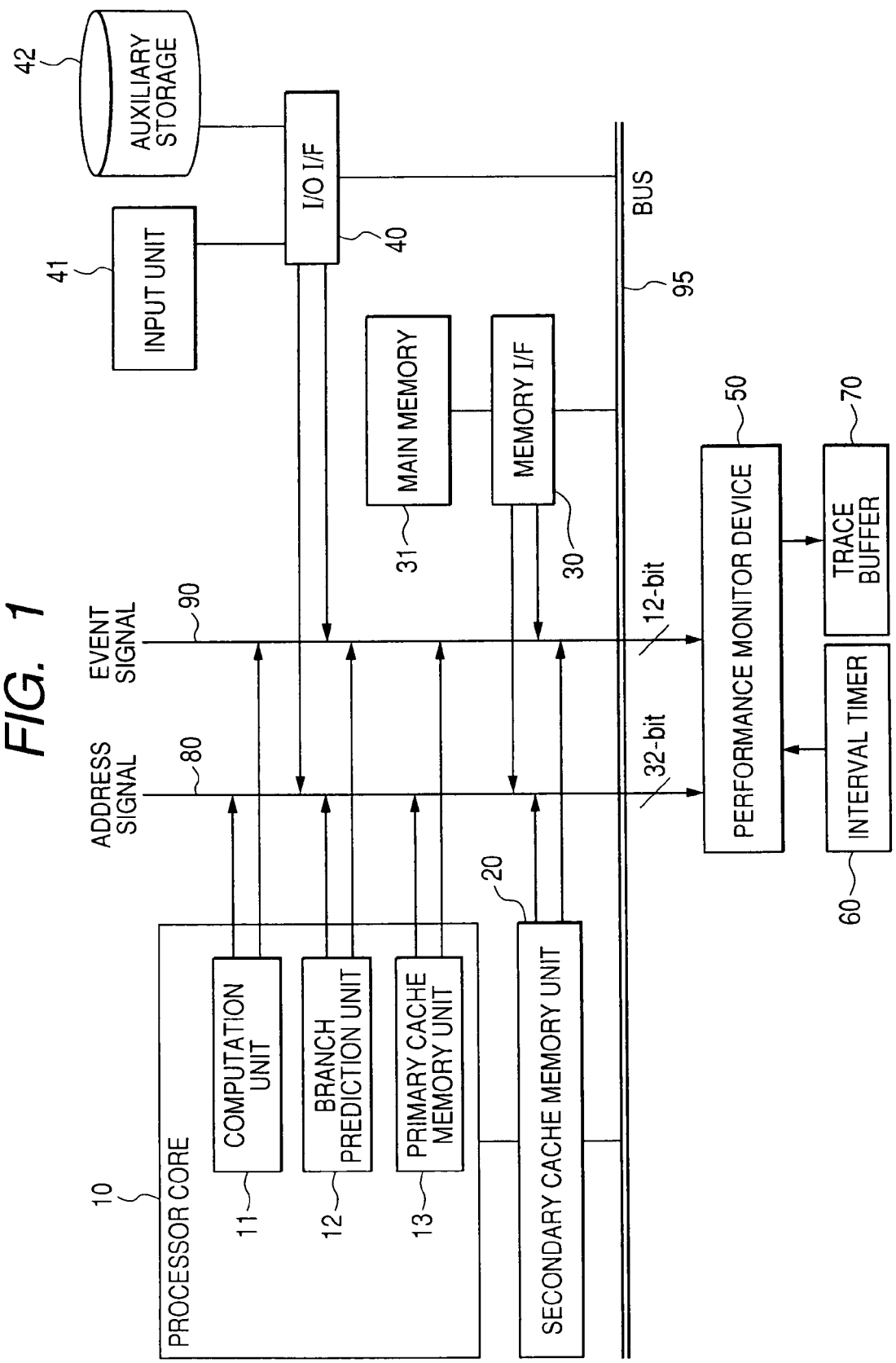
FIG. 1 is a block diagram to show the configuration of an information processing apparatus according to an embodiment of the invention.

FIG. 1 is a block diagram to show an information processing apparatus according to an embodiment of the present invention.

The information processing apparatus includes a processor core 10 containing a computation unit 11 for performing computation processing, a branch prediction unit 12 for performing branch prediction, and a primary cache memory unit 13, main memory 31 for storing data, a memory I/F (interface) 30 that serves as a memory controller for the main memory 31, a secondary cache memory unit 20 that is provided between the main memory 31 and the processor core 10, an input unit 41 for performing input operation, auxiliary storage 42 for storing large-capacity data, an I/O interface 40 for controlling the input unit 41 and the auxiliary storage 42, a performance monitor device 50 for storing an event by receiving an address signal and an event signal in time series, an interval timer 60 for transmitting a trigger to the performance monitor device 50 every given time, and a trace buffer 70 for writing the description of the event stored in the performance monitor device 50.

The computation unit 11, the branch prediction unit 12, the primary cache memory unit 13, the secondary cache memory unit 20, the memory I/F 30, and the I/O interface 40 (which will be hereinafter referred to collectively as event target hardware) transmit an address signal and an event signal to the performance monitor device 50 via an address signal line 80 and an event signal line 90 when an event occurs. The performance monitor device 50 receives the address signal and the event signal in time series and performs event sampling. The secondary cache memory unit 20, the memory I/F 30, and the I/O interface 40 are connected to a bus 95.

The address signal indicates an instruction address of the program executed by the processor core 10. The event signal indicates an event occurring in the event target hardware. Here, for example, it is assumed that the signal width of the address signal line 80 is 32 bits and the signal width of the event signal line 90 is 12 bits.

Figure 2:
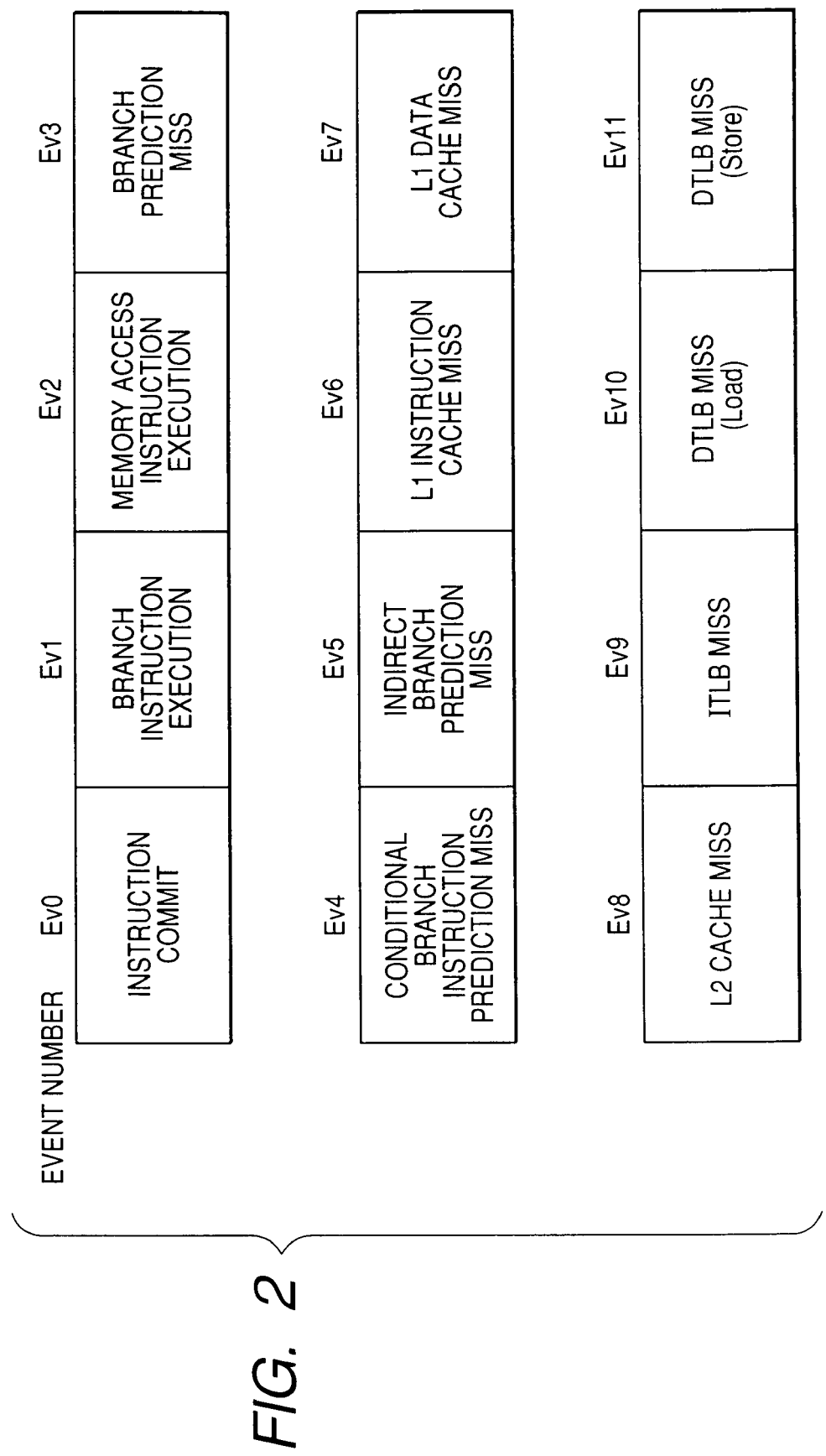
FIG. 2 shows a configuration example of an event signal according to the embodiment.

FIG. 2 shows an example of the event signal output to the event signal line 90. The event signal is formed of a bit string of 12 bits and 12 events are set therein. The bits are assigned event numbers of Ev0, Ev1, . . . , Ev11 and the following events are set in the event numbers: (Each of the bits of Ev0, Ev1, . . . , Ev11 is set to "1" if the corresponding event occurs; "0" when the corresponding event does not occur.)

Ev0 (instruction commit) indicates instruction execution completion. That is, when an instruction is processed in pipeline in the processor and execution of all stages is complete, Ev0 is set to "1;" otherwise, Ev0 is set to "0."

Ev1 (branch instruction execution) is set to "1" when execution of a branch instruction is complete; otherwise, "0."

Ev2 (memory access instruction execution) is set to "1" when execution of a load instruction or a store instruction is complete; otherwise, "0."

Ev3 (branch prediction miss) is set to "1" when a branch prediction miss in a branch instruction occurs; otherwise, "0."

Ev4 (conditional branch instruction prediction miss) is set to "1" when a branch prediction miss in a conditional branch instruction occurs; otherwise, "0." The conditional branch instruction is an instruction branching to a condition specified in instruction (for example, when the value of the specified register is 0) and is a kind of branch instruction.

Ev5 (indirect branch prediction miss) is set to "1" when a branch prediction miss occurs in a branch instruction wherein the address of the next instruction to be executed is specified according to a register; otherwise, "0."

Ev6 (L1 instruction cache miss) is set to "1" when instruction access is made to the primary cache memory unit 13 and results in a cache miss; otherwise, "0."

Ev7 (L1 data cache miss) is set to "1" when data access is made to the primary cache memory unit 13 and results in a cache miss; otherwise, "0."

Ev8 (L2 cache miss) is set to "1" when access is made to the secondary cache memory unit 20 and results in a cache miss; otherwise, "0."

Ev9 (ITLB miss) is set to "1" when a TLB (Translation Look-aside Buffer) miss occurs at the instruction access time; otherwise, "0."

Ev10 (DTLB miss (Load)) is set to "1" when a TLB miss occurs at the data access time according to a Load instruction; otherwise, "0."

Ev11 (DTLB miss (Store)) is set to "1" when a TLB miss occurs at the data access time according to a Store instruction; otherwise, "0."

Figure 3:
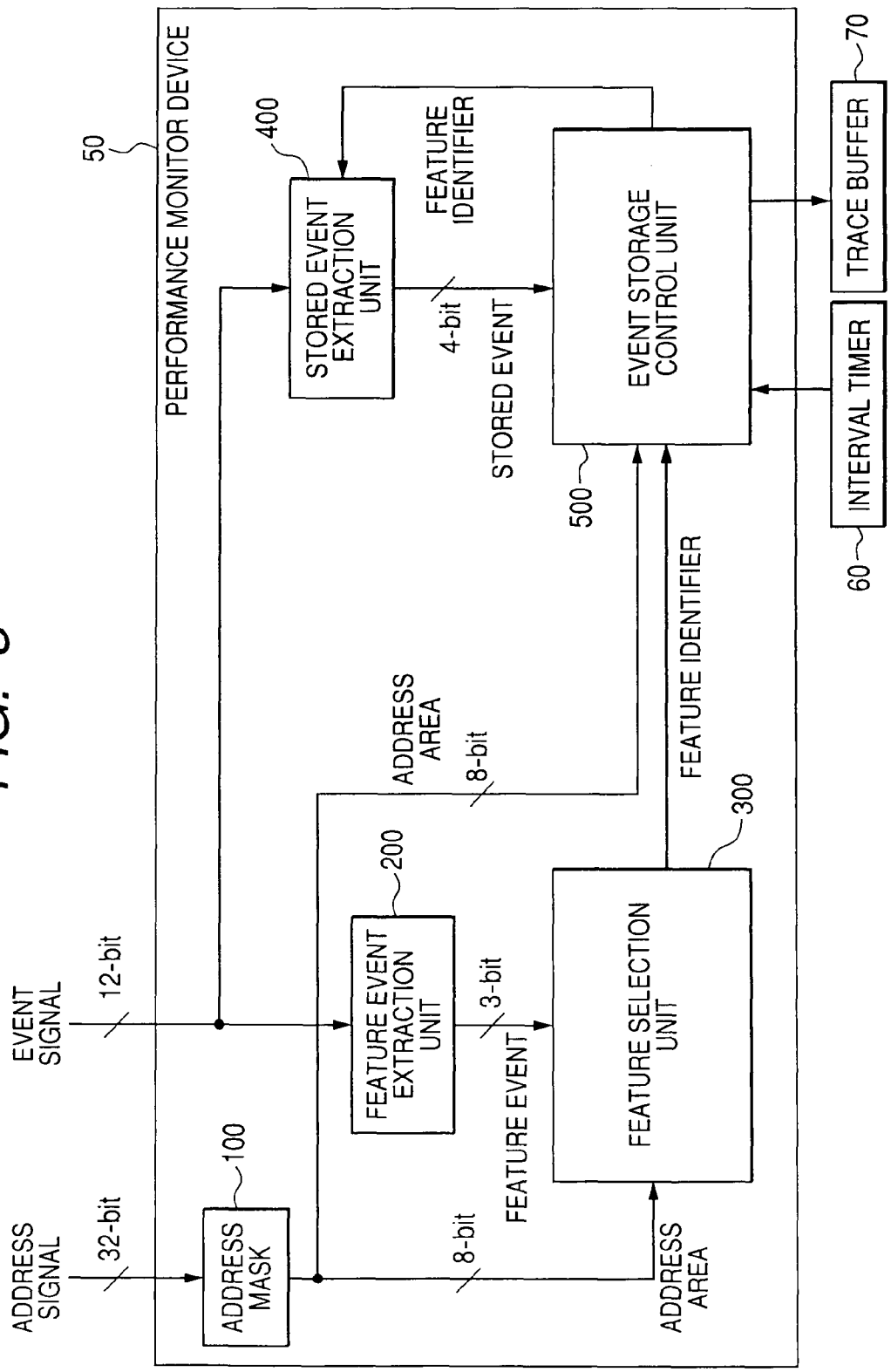
FIG. 3 is a block diagram to show a performance monitor device according to the embodiment.

FIG. 3 is a block diagram of the performance monitor device 50. The performance monitor device 50 includes an address mask 100 for receiving an address signal from the address signal line 80 and determining the address area, a feature event extraction unit 200 for receiving an event signal from the event signal line 90 and extracting a feature event, a feature selection unit 300 for receiving the address area from the address mask 100 and the feature event from the feature event extraction unit 200 and selecting the feature of the program being executed from them, a stored event extraction unit 400 for receiving the event signal from the event signal line 90 and extracting one from among the internally stored events, and an event storage control unit 500 for receiving the address area from the address mask 100 and a feature identifier output from the feature selection unit 300, controlling the stored event extraction unit 400, and counting the number of stored events.

When receiving the address signal, the address mask 100 outputs the address area indicated by the address signal. The address area is the high-order eight bits of the bit string provided by performing an AND operation to a 32-bit mask bit string with the high-order eight bits being "1" and other 25 bits being "0" and the 32-bit address signal, for example. Therefore, 256 address areas exist. The address area output from the address mask 100 is supplied to the feature selection unit 300 and the event storage control unit 500. The reason why the address area is created is that the event to be stored by the stored event extraction unit 400 of the performance monitor device 50 is determined for each address area.

Figure 4:
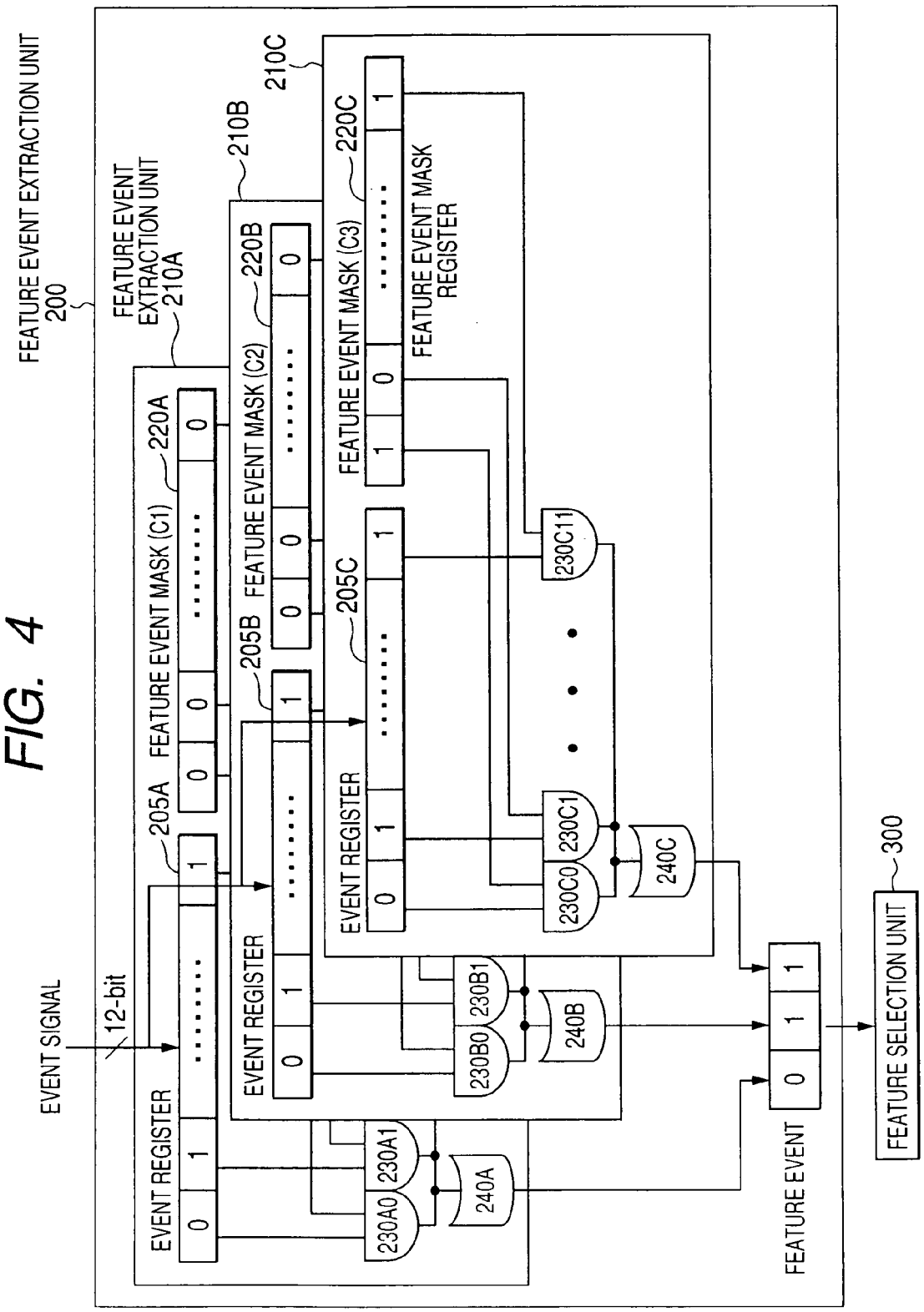
FIG. 4 is a block diagram to show a configuration of a feature event extraction unit according to the embodiment.

FIG. 4 is a block diagram to show an example of the feature event extraction unit 200. The feature event extraction unit 200 includes feature event extraction units 210A to 210C of three groups having three event registers 205A to 205C for storing a 12-bit event signal, three feature event mask registers 220A to 220C for storing a 12-bit feature event mask, AND computing elements 230A0 to 230A11, 230B0 to 230B11, and 230C0 to 230C11 for performing AND operation on the corresponding bits of the 12-bit event signal from the event registers 205A to 205C and the 12-bit feature event mask from the feature event mask registers 220A to 220C, an OR computing element 240A for performing OR operation on the outputs of the AND computing elements 230A0 to 230A11, an OR computing element 240B for performing OR operation on the outputs of the AND computing elements 230B0 to 230B11, and an OR computing element 24C for performing OR operation on the outputs of the AND computing elements 230C0 to 230C11. The number of the feature event extraction units 210A to 210C is not limited to three.

The one-bit output of each of the feature event extraction units 210A to 210C is feature event C1, C2, C3. The three-bit feature event output by the feature event extraction unit 200 is a concatenation of the feature events C1, C2, and C3. That is, the feature event extraction unit 200 inputs the event signal and outputs the three-bit feature event of a representative event for determining the feature of the program.

Figure 5:
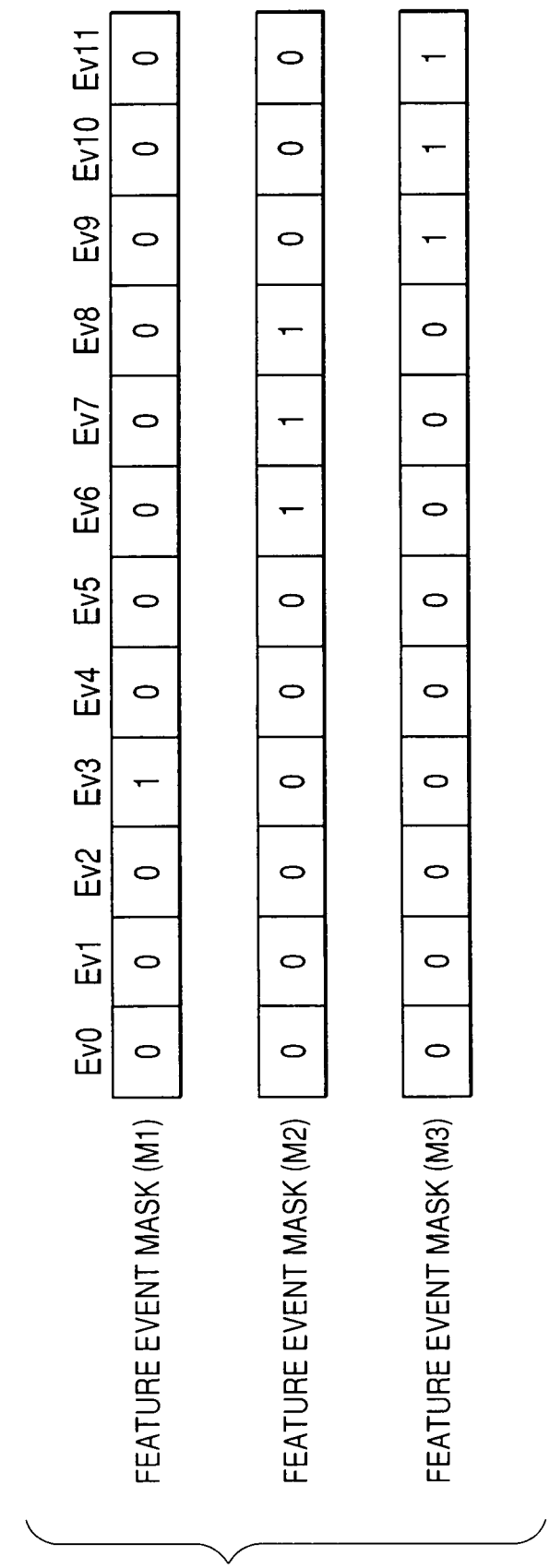
FIG. 5 shows setting examples of feature event masks according to the embodiment.

FIG. 5 shows setting examples of feature event masks M1, M2, and M3. The operator can preset different feature event masks (M1, M2, and M3) for the feature event extraction units 210A to 210C of the feature event extraction unit 200.

In the feature event mask M1, only the bit corresponding to Ev3 (branch prediction miss) is set to "1" and other bits are set to "0." That is, the feature event extraction unit 210A retaining the feature event mask M1 outputs the feature event C1 (branch prediction miss) as "1" only when receiving an event signal with Ev3 (branch prediction miss) set to "1;" otherwise, the feature event extraction unit 210A outputs "0."

In the feature event mask M2, the bits corresponding to Ev6 (L1 instruction cache miss), Ev7 (L1 data cache miss) and Ev8 (L2 cache miss) are set to "1" and other bits are set to "0." That is, the feature event extraction unit 210B retaining the feature event mask M2 outputs the feature event C2 (cache miss) as "1" only when receiving an event signal with at least one of Ev6 (L1 instruction cache miss), Ev7 (L1 data cache miss), or Ev8 (L2 cache miss) set to "1;" otherwise, the feature event extraction unit 210B outputs "0."

In the feature event mask M3, the bits corresponding to Ev9 (ITLB miss), Ev10 (DTLB miss (Load)), and Ev11 (DTLB miss (Store)) are set to "1" and other bits are set to "0." That is, the feature event extraction unit 210C retaining the feature event mask M3 outputs the feature event C3 (TLB miss) as "1" only when receiving an event signal with at least one of Ev9 (ITLB miss), Ev10 (DTLB miss (Load)), or Ev11 (DTLB miss (Store)) set to "1;" otherwise, the feature event extraction unit 210C outputs "0."

The feature event C1 is set to "1" when a branch prediction miss occurs during program execution. The feature event C2 is set to "1" when a cache miss occurs during program execution. The feature event C3 is set to "1" when a TLB miss occurs during program execution. Thus, the numbers of occurrences of the feature events C1, C2, and C3 are counted, whereby the occurrence frequencies of branch prediction miss, cache miss, and TLB miss can be examined.

Figure 6:
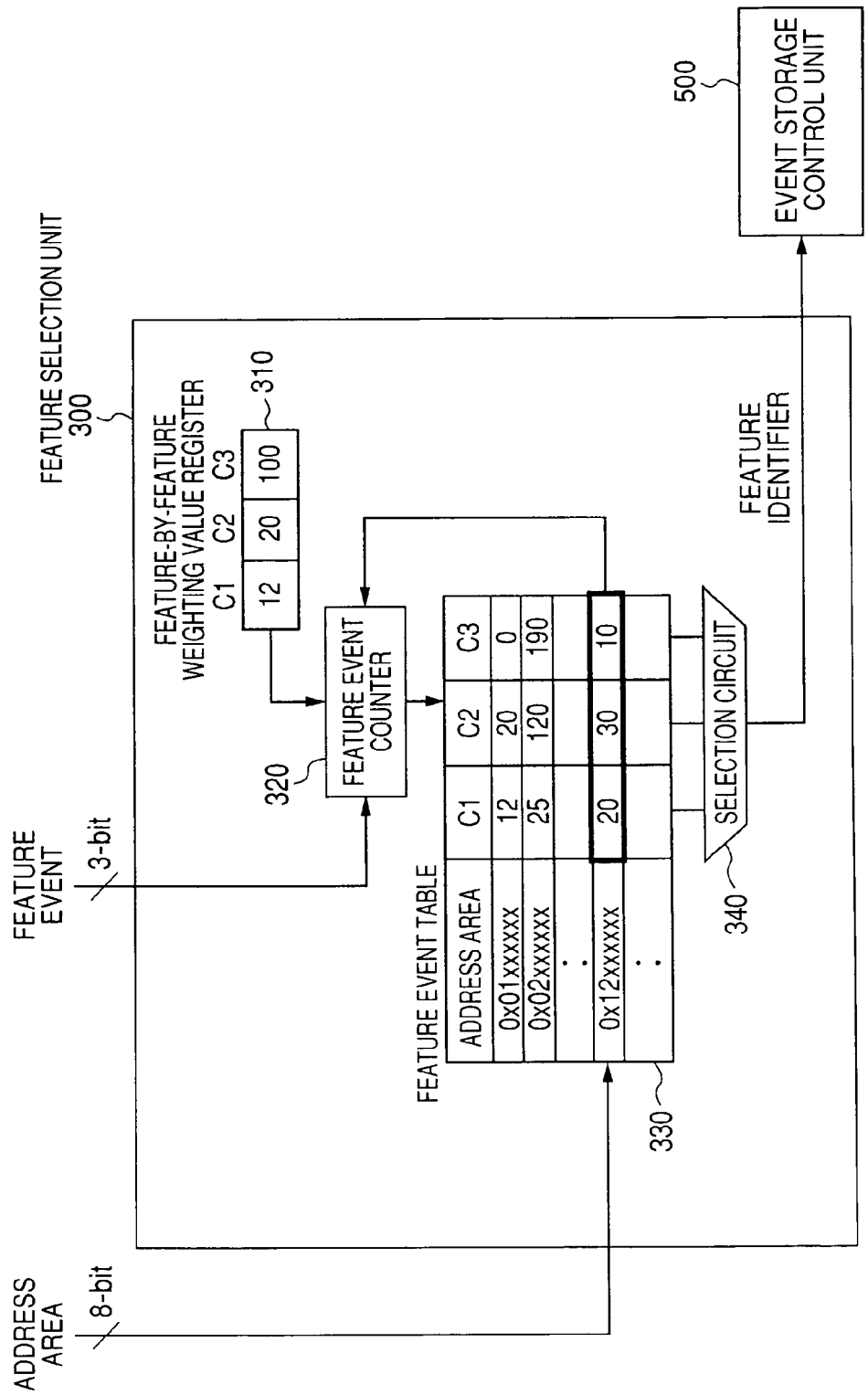
FIG. 6 is a block diagram to show a configuration of a feature selection unit according to the embodiment.

FIG. 6 is a block diagram to show an example of the feature selection unit 300. The feature selection unit 300 includes a feature-by-feature weighting value register 310 for storing feature-by-feature weighting values in a one-to-one correspondence with the feature events C1, C2, and C3, a feature event counter 320 for counting the numbers of occurrences of the feature events C1, C2, and C3 in response to the feature-by-feature weighting values set in the feature-by-feature weighting value register 310, a feature event table 330 having a storage area for storing the count results of the feature event counter 320 for each address area, and a selection circuit 340 for outputting the feature event with the maximum value of the feature event C1, C2, C3 read from the feature event table 330 as a feature identifier. The feature selection unit 300 outputs the feature identifier indicating the feature of the program being executed.

Each of the feature-by-feature weighting values stored in the feature-by-feature weighting value register 310 is the value added when the number of occurrences of feature events is counted. For example, the feature-by-feature weighting value of the feature event C1 (branch prediction miss) is set to 12, the feature-by-feature weighting value of the feature event C2 (cache miss) is set to 20, and the feature-by-feature weighting value of the feature event C3 (TLB miss) is set to 100. The feature-by-feature weighting value is calculated based on the number of stalls when the corresponding feature event occurs. In this case, the sum totals of the numbers of stalls of the feature events C1 (branch prediction miss), C2 (cache miss), and C3 (TLB miss) occurring during program execution are retained in the feature event table 330. If the count result (the number of stalls) of the feature event C1 (branch prediction miss) is the maximum in the count results (the numbers of stalls) of the feature events retained in one address area of the feature event table 330, the program is determined having the feature that an increase in the processing time caused by the branch prediction misses is large, and the feature identifier output from the selection circuit 340 is the value indicating the feature event C1. That is, the feature of the program incurring an increase in the processing time is indicated in the feature identifier. This processing is also performed in a similar manner if the count result of the feature event C2 (cache miss) or C3 (TLB miss) is the maximum.

The feature-by-feature weighting values can be set as the power consumption amounts when the feature events C1 (branch prediction miss), C2 (cache miss), and C3 (TLB miss) occur. The feature-by-feature weighting values are set in such a manner, whereby large power consumption is caused by occurrence of which event can be determined as the feature of the program.

Figure 7:
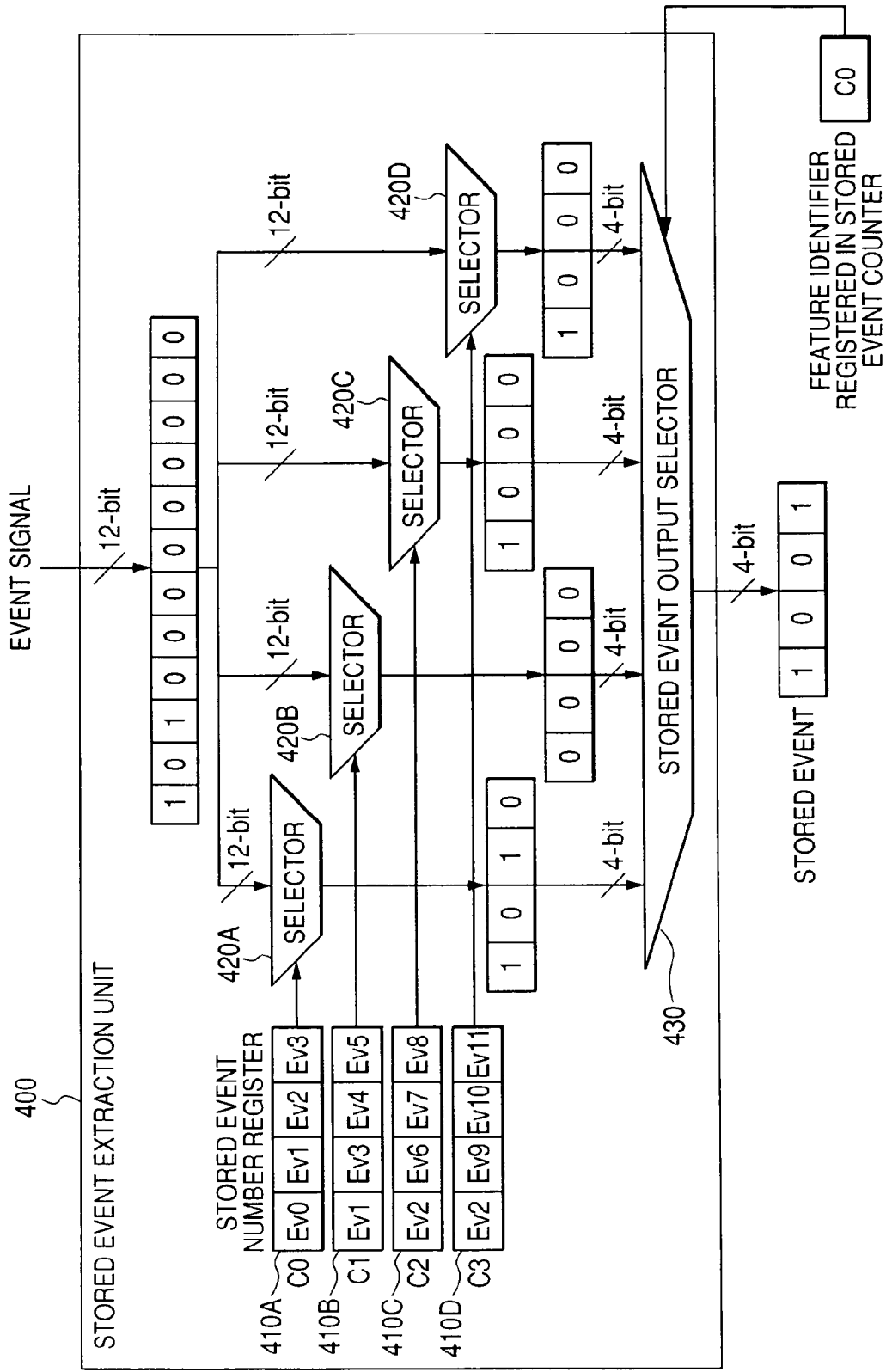
FIG. 7 is a block diagram to show a configuration of a stored event extraction unit according to the embodiment.

FIG. 7 is a block diagram to show an example of the stored event extraction unit 400. The stored event extraction unit 400 includes stored event number registers 410A to 410D each for storing the stored event numbers defined for four types of feature identifiers, selectors 420A to 420D each for extracting only the events specified in the stored event numbers stored in each of the stored event number registers 410A to 410D from the event signal and outputting them as stored event candidates, and a stored event output selector 430 for outputting any of the outputs of the selectors 420A to 420D as the stored event based on the feature identifier.

Four types of stored events are selected from among the 12 types of events retained in the event signal according to the feature identifier transmitted from the event storage control unit 500 and the stored event number set in the stored event extraction unit 400. The four-bit stored event output from the stored event extraction unit 400 is stored in the event storage control unit 500.

The stored event numbers in the stored event number registers 410A to 410D specify the stored events for each feature identifier. In the invention, the stored event numbers are not limited to four types (four bits).

Figure 8:
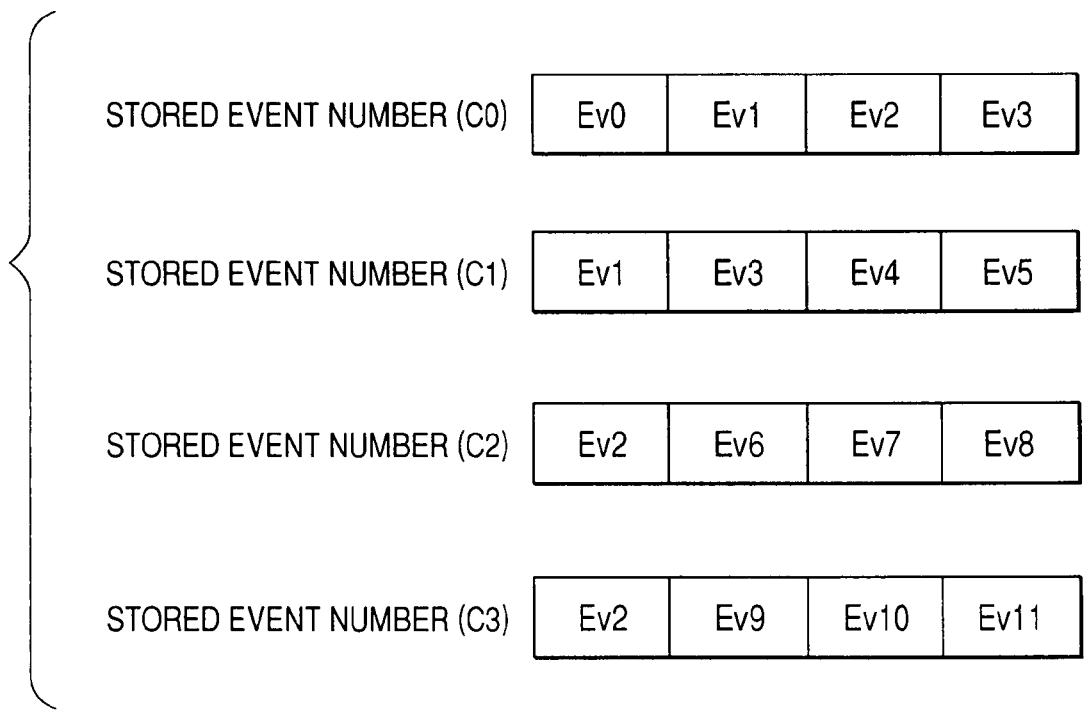
FIG. 8 shows setting examples of stored event numbers according to the embodiment.

FIG. 8 shows setting examples of the stored event numbers. The stored event numbers are set by the operator and are not limited to the setup examples.

If the feature identifier indicates the feature event C0 (exception handling), it means that the feature selection unit 300 does not yet select the feature of the program. Thus, the stored event number C0 is set to Ev0 (instruction commit), Ev1 (branch instruction execution), Ev2 (memory access execution), Ev3 (branch prediction miss) so as to event a general-purpose event.

If the feature identifier indicates the feature event C1 (branch prediction miss), it means that a branch prediction miss frequently occurs or performance degradation caused by a branch prediction miss is large in the program being executed. Then, the stored event number C1 is set to Ev1 (branch instruction execution), Ev3 (branch prediction miss), Ev4 (conditional branch prediction miss), Ev5 (indirect branch prediction miss) to examine which type of branch instruction a prediction miss occurs in.

If the feature identifier indicates the feature event C2 (cache miss), it means that a cache miss frequently occurs or performance degradation caused by a cache miss is large in the program being executed. Then, the stored event number C2 is set to Ev2 (memory access execution), Ev6 (L1 instruction cache miss), Ev7 (L1 data cache miss), Ev8 (L2 cache miss) to examine which level of hierarchy a prediction miss occurs at or whether a cache miss occurs in a Load instruction or a Store instruction.

If the feature identifier indicates the feature event C3 (TLB miss), it means that a TLB miss frequently occurs or performance degradation caused by a TLB miss is large in the program being executed. Then, the stored event number C3 is set to Ev2 (memory access execution), Ev9 (ITLB miss), Ev10 (DTLB miss (Load)), Ev11 (DTLB miss (Store)) to examine which TBL a miss occurs in or whether a TBL miss occurs in a Load instruction or a Store instruction.

The stored event numbers C0 to C3 set as described above are retained in the stored event number registers 410A to 410D. The stored event numbers C0 to C3 retained in the stored event number registers 410A to 410D control the operation of the selectors 420A to 420D.

The operation of the stored event extraction unit 400 when the event signal indicating the presence of absence of each of the 12 types of events is "101000000000," for example, as shown in FIG. 7 will be discussed.

The selector 420A receives the event signal and the stored event number C0 (Ev0, Ev1, Ev2, Ev3). The selector 420A outputs a four-bit bit string "1010" indicating the presence of absence of each event about Ev0, Ev1, Ev2, Ev3 as stored event candidate according to the signal of the stored event number register 410A. By performing similar processing, the selector 420B outputs "0000" as stored event candidate according to the signal of the stored event number register 410B; the selector 420C outputs "1000" as stored event candidate according to the signal of the stored event number register 410C; and the selector 420D outputs "1000" as stored event candidate according to the signal of the stored event number register 410D.

The stored event output selector 430 receives the four stored event candidates output from the selectors 420A to 420D and the feature identifier retained by the event storage control unit 500 (in the example, it is assumed that the feature identifier is C0) and outputs stored event candidate "1010" as stored event according to the feature identifier C0.

Figure 9:
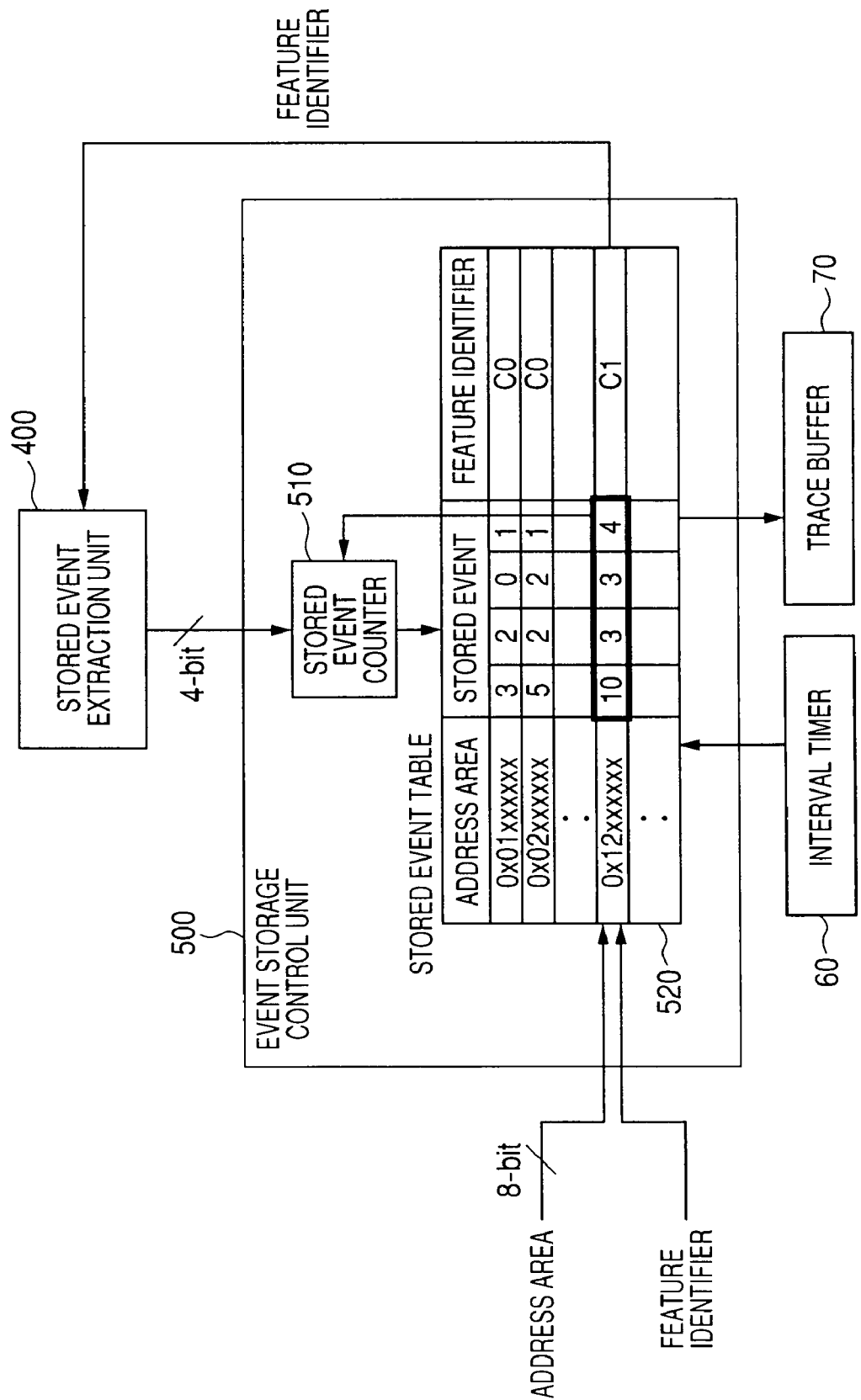
FIG. 9 is a block diagram to show a configuration of an event storage control unit according to the embodiment.

FIG. 9 is a block diagram to show an example of the event storage control unit 500. The event storage control unit 500 includes a stored event counter 510 for counting the number of occurrences of stored events received from the stored event extraction unit 400 and a stored event table 520 for storing the count of the stored event counter 510 for each address area. The address area from the address mask 100 and the feature identifier from the feature selection unit 300 are input to the stored event table 520. Whenever the event storage control unit 500 receives a trigger from the interval timer 60 every given period, it writes the information stored in the stored event table 520 into the trace buffer 70.

Figure 10:
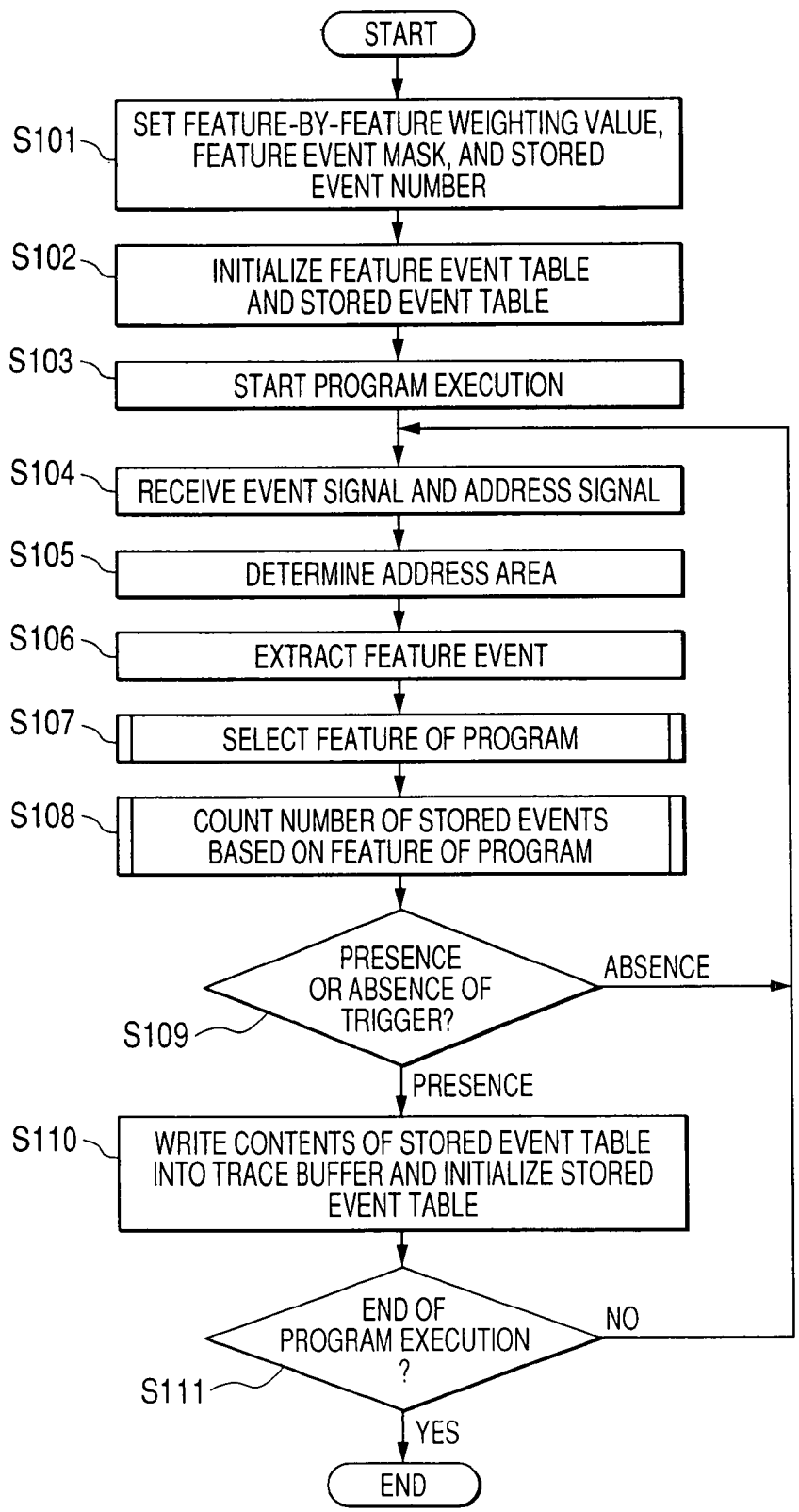
FIG. 10 is a flowchart to show an operation of the performance monitor device according to the embodiment.

Next, the operation of the performance monitor device 50 according to the embodiment of the invention will be discussed with FIGS. 3 and 10. FIG. 10 is a flowchart to show the operation of the performance monitor device 50 according to the embodiment.

As initialization before the performance monitor device 50 is used, the operator presets the feature-by-feature weighting value, the feature event mask, and the stored event number (step S101). As the initialization operation of the performance monitor device 50, the feature event table 330 and the stored event table 520 are initialized (step S102). That is, the count results retained by the feature event table 330 and the stored event table 520 are set to "0" and the feature identifier retained by the stored event table 520 is set to the value indicating "feature event C0."

The operator starts any desired program and starts execution of the program (step S103). When the program is executed, the event target hardware in FIG. 1 transmits an event signal and an address signal to the performance monitor device 50 via the address signal line 80 and the event signal line 90.

The performance monitor device 50 receives the event signal and the address signal (step S104). The event signal is input to the feature event extraction unit 200 and the stored event extraction unit 400. The address signal is input to the address mask 100.

The address mask 100 masks the received 32-bit address signal, determines the eight-bit address area to which the address signal belongs, and transmits the address area to the feature selection unit 300 and the event storage control unit 500 (step S105). The feature event extraction unit 200 extracts a three-bit feature event from the received 12-bit event signal and transmits the feature event to the feature selection unit 300 (step S106).

The feature selection unit 300 selects the feature of the program being executed using the eight-bit address area received from the address mask 100 and the three-bit feature event received from the feature event extraction unit 200 (step S107). The method of selecting the feature of the program being executed by the feature selection unit 300 is described later in detail. Then, the feature selection unit 300 transmits the feature identifier indicating the feature of the program being executed to the event storage control unit 500.

The event storage control unit 500 and the stored event extraction unit 400 count the number of the stored events corresponding to the feature of the program using the feature identifier received from the feature selection unit 300 (step S108). The method of counting the number of the events corresponding to the feature of the program by the event storage control unit 500 is described later in detail.

The operation of the performance monitor device 50 in receiving one pair of the address signal and the event signal is now complete. After this, if the event storage control unit 500 does not receive a trigger from the interval time 60 (absence at step S109), the operation at steps S104 to S108 is repeated each time an address signal and an event signal are received.

On the other hand, if the event storage control unit 500 receives a trigger from the interval time 60 (presence at step S109), the contents of the stored event table 520 are written into the trace buffer 70 and are initialized (step S110).

Then, if the program execution does not terminate (NO at step S111), whenever the performance monitor device 50 receives an address signal and an event signal, it repeats the operation at steps S104 to S110. On the other hand, if the program execution terminates (YES at step S111), the performance monitor device 50 terminates the operation.

Figure 11:
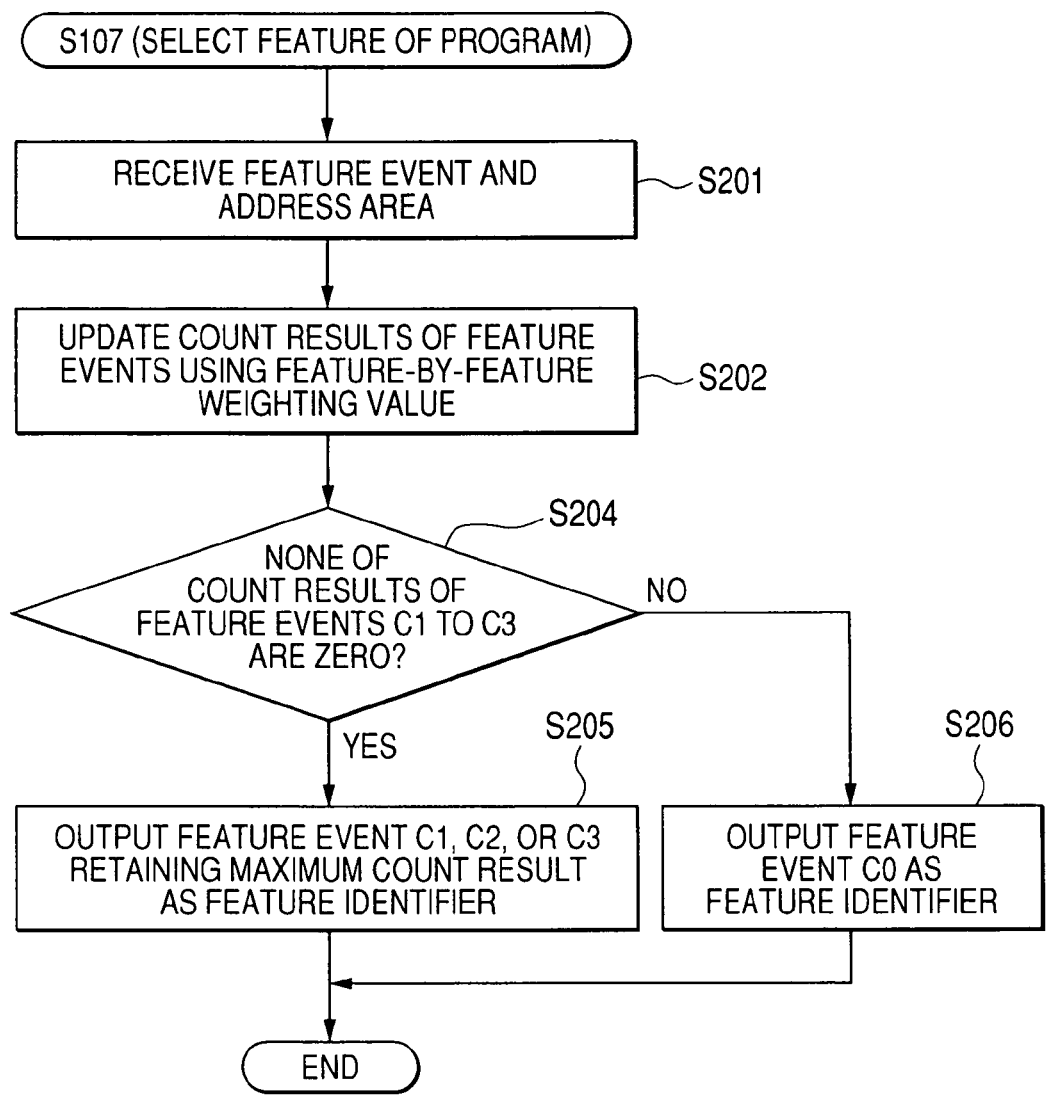
FIG. 11 is a flowchart to show an operation of a feature selection unit according to the embodiment.

Next, the operation of the feature selection unit 300 of the performance monitor device 50 according to the embodiment of the invention will be discussed with FIGS. 6 and 11. FIG. 11 is a flowchart to show the operation of the feature selection unit 300 of the performance monitor device 50 according to the embodiment.

The feature selection unit 300 supplies the address area received from the address mask 100 to the feature event table 330 and supplies the feature event received from the feature event extraction unit 200 to the feature event counter 320 (step S201).

The feature event table 330 has a storage area for storing the count results of the feature events C1, C2, and C3 every 256 address areas. The feature event table 330 receives the address area and transmits the counts of the feature events C1, C2, and C3 in the address area to the feature event counter 320.

The feature event counter 320 is implemented as an eight-bit saturation counter. The feature event counter 320 receives the feature events C1, C2, and C3, the feature-by-feature weighting values corresponding to the feature events C1, C2, and C3, set in the feature-by-feature weighting value register 310 at step S101, and the counts corresponding to the feature events C1, C2, and C3 from the feature event table 330. The feature event counter 320 adds the corresponding feature-by-feature weighting value to the count corresponding to the feature event having a value of "1." On the other hand, it subtracts one from the count (the number of occurrences) of the feature event having a value of "0," of the feature events C1, C2, and C3. The value to be subtracted is not limited to one. The feature event counter 320 transmits the calculation result to the feature event table 330. The feature event table 330 stores the counts of the feature events C1, C2, and C3 received from the feature event counter 320 in the same address area and updates the counts (step S202).

After the feature event table 330 is updated, if none of the counts (the numbers of occurrences) of the feature events C1, C2, and C3 are 0 (YES at step S204), the selection circuit 340 selects the feature event with the maximum count (number of occurrences) (C1, C2, or C3) and transmits it to the event storage control unit 500 as feature identifier and terminates the operation (step S205). If the counts are the same, the feature event with the minimum feature event number may be selected. The feature identifier is used to specify the event to be stored in the event storage control unit 500. On the other hand, if the counts (the numbers of occurrences) of the feature events C1, C2, and C3 are all 0 (NO at step S204), the selection circuit 340 selects the feature event C0 indicating exception handling and transmits the selected feature event C0 to the event storage control unit 500 as feature identifier and terminates the operation (step S206).

Next, steps S202 to S206 will be discussed with an example using FIGS. 12 to 14. It is assumed that the feature-by-feature weighting values corresponding to the feature events C1, C2, and C3, set in the feature-by-feature weighting value register 310 are 12, 20, and 100 respectively.

Figure 12:
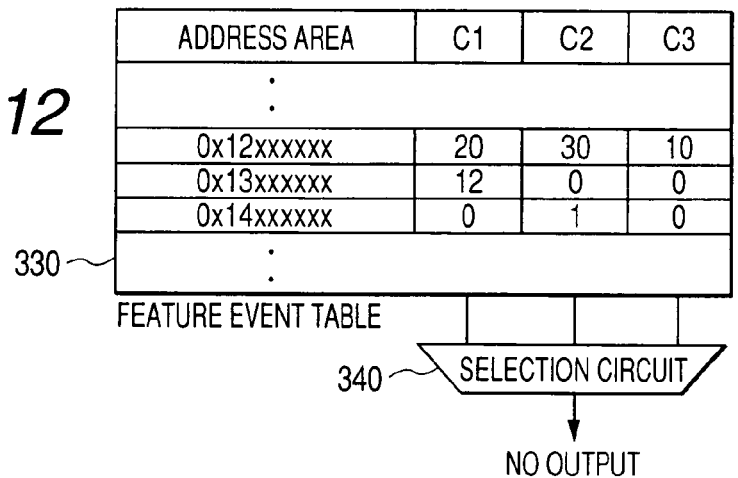
FIG. 12 is a drawing to show values retained in a stored event table and an output of a selection circuit according to the embodiment.
Figure 13:
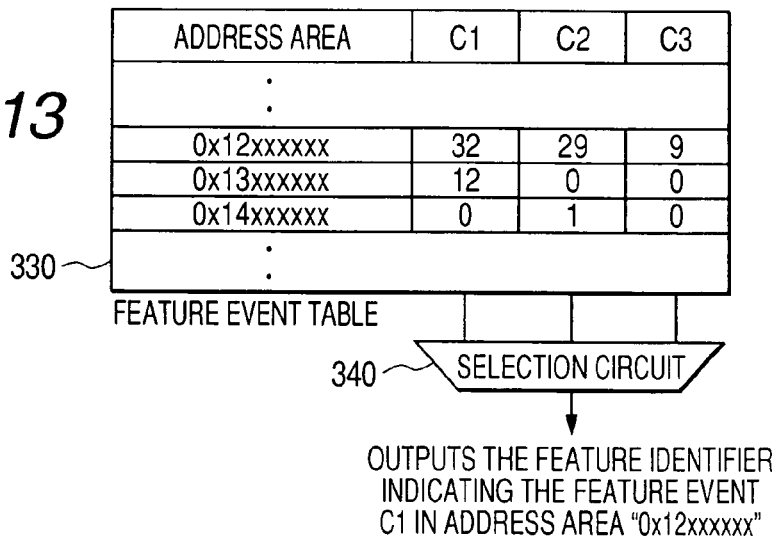
FIG. 13 is a drawing to show values retained in a stored event table and an output of the selection circuit according to the embodiment.

FIG. 12 shows the values retained in the feature event table 330. It is assumed that the counts of the feature events C1, C2, and C3 in address area "0x12xxxxxx" are 20, 30, and 10 respectively. It is assumed that the counts of the feature events C1, C2, and C3 in address area "0x13xxxxxx" are 12, 0, and 0 respectively. Further, it is assumed that the counts of the feature events C1, C2, and C3 in address area "0x14xxxxxx" are 0, 1, and 0 respectively.

Here, it is assumed that the feature selection unit 300 receives the address area "0x12xxxxxx" from the address mask 100 and feature event "100" (which means that C1="1," C2="0," C3="0") from the feature event extraction unit 200.

Since feature event C1="1," the count value 20 of the feature event C1 in the address area "0x12xxxxxx" and the feature-by-feature weighting value 12 of the feature event C1 are added together and the count value of the feature event C1 becomes 32. Since feature events C2="0" and C3="0," one is subtracted from the count values 30 and 10 of the feature events C2 and C3 in the address area "0x12xxxxxx" and the count values of the feature events C2 and C3 become 29 and 9 respectively. Consequently, the update values 32, 29, and 9 are stored in the address area "0x12xxxxxx" of the feature event table 330 as shown in FIG. 13.

At this time, the feature event retaining the maximum count is C1 in the address area "0x12xxxxxx" and therefore the selection circuit 340 outputs the feature identifier C1 indicating the feature event C1.

Next, it is assumed that the feature selection unit 300 receives the address area "0x14xxxxxx" from the address mask 100 and feature event "000" from the feature event extraction unit 200.

Figure 14:
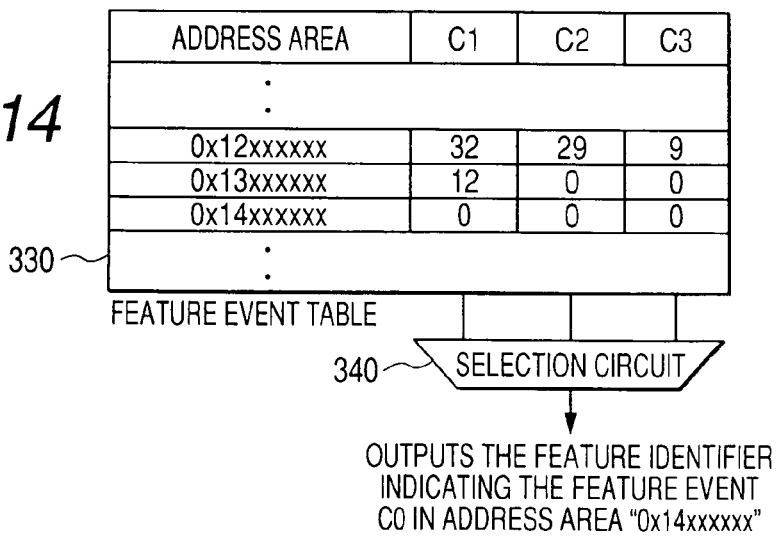
FIG. 14 is a drawing to show values retained in a stored event table and an output of the selection circuit according to the embodiment.

Since the counts of the feature events in the address area "0x14xxxxxx" are 0, 1, and 0 and the bits of the feature event from the feature event extraction unit 200 are all "0," one is subtracted from the count values of the feature events C1, C2, and C3 in the address area "0x14xxxxxx" and the update values 0, 0, and 0 are stored in the address area "0x14xxxxxx" of the feature event table 330 as shown in FIG. 14.

At this time, the counts of the feature events C1, C2, and C3 in the address area "0x14xxxxxx" are all 0 and therefore the selection circuit 340 outputs the feature identifier C0 indicating the feature event C0 as exception handling.

The reason why one is subtracted from the count if the count of the feature event is 0 when the feature events C1, C2, and C3 are counted by the feature event counter 320 are as follows:

First, the feature event counter 320 is an eight-bit saturation counter and thus can take a value in the range of 0 to 255. The feature event table 330 is initialized to 0 only just after the operation of the performance monitor device 50 starts.

If one is not subtracted from the count when the count of the feature event is 0, the value stored in the feature event table 330 is only added during program execution and it is saturated sooner or later (takes the value 255). Consequently, the counts of the feature events C1, C2, and C3 become the same and the feature selection unit 300 cannot select any program feature. Thus, when the feature event counter 320 counts the feature events C1, C2, and C3, if the count of the feature event is 0, one is subtracted from the count.

If the value to be subtracted is too large, the values stored in the feature event table 330 become 0 only and likewise, the feature selection unit 300 cannot select any program feature. Then, the value to be subtracted needs to be set considering the feature-by-feature weighting value, the program feature, the number of bits of the saturation counter, etc.

Figure 15:
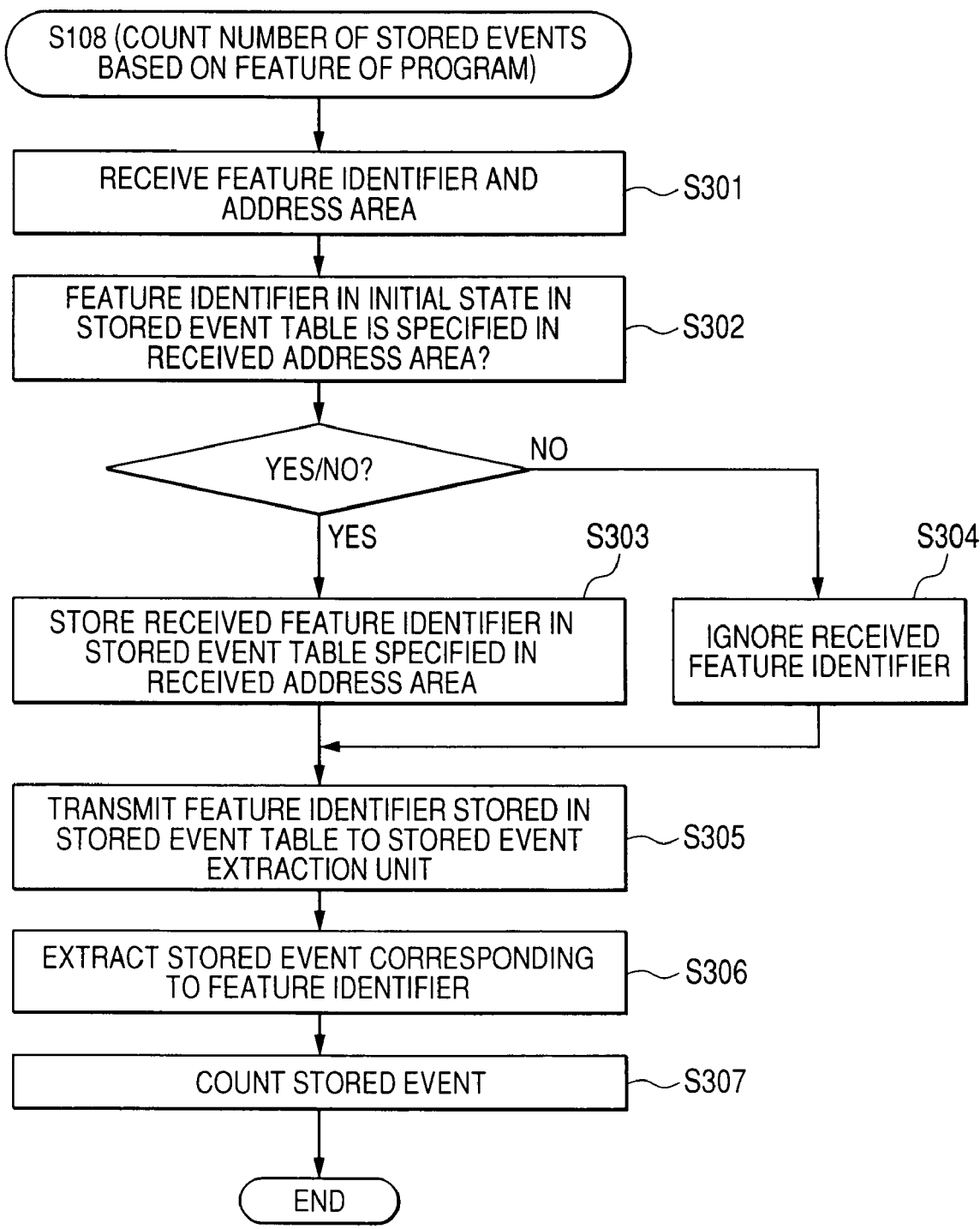
FIG. 15 is a flowchart to show an operation of an event storage control unit according to the embodiment.

Next, the operation of the event storage control unit 500 of the performance monitor device 50 according to the embodiment of the invention will be discussed with FIGS. 7 and 15. FIG. 15 is a flowchart to show the operation of the event storage control unit 500 of the performance monitor device 50 according to the embodiment of the invention.

The event storage control unit 500 supplies the address area received from the address mask 100 and the feature identifier received from the feature selection unit 300 to the stored event table 520 and supplies the stored event received from the stored event extraction unit 400 to the stored event counter 510 (step S301).

The stored event table 520 has a storage area for storing the counts of the stored events (four types of events) corresponding to the feature identifiers every 256 address areas. The events corresponding to the feature identifiers are not limited to the four types.

When the stored event table 520 receives the address area and the feature identifier, if the feature identifier is in the initial state in the corresponding address area of the stored event table 520 (YES in step S302), the feature identifier received from the feature selection unit 300 is stored (step S303). On the other hand, if the feature identifier is not in the initial state in the corresponding address area of the stored event table 520 (NO in step S302), the feature identifier received from the feature selection unit 300 is ignored (step S304). In so doing, the feature identifier specifying the stored event is not updated and recording the record event of the same type can be continued until the count results of the stored events in the stored event table 520 are written into the trace buffer 70 (step S110 in FIG. 10). Then, the feature identifier retained in the corresponding address area is transmitted to the stored event extraction unit 400. The stored event extraction unit 400 extracts the stored event according to the feature identifier received from the event storage control unit 500 as described above and transmits the stored event to the event storage control unit 500 (step S306).

The event storage control unit 500 receives the stored event from the stored event extraction unit 400 and supplies the stored event to the stored event counter 510. It also transmits the count (the number of occurrences) corresponding to each stored event in the received address area of the stored event table 520 to the stored event counter 510.

When receiving the stored event and the count of the stored event, the stored event counter 510 adds one to the count of the stored event having a value of "1." The stored event counter 510 transmits the calculation result to the stored event table 520. The stored event table 520 updates the count of the stored event according to the calculation result received from the stored event counter 510 (step S307).

Thus, the information processing apparatus according to the embodiment of the invention makes it possible to efficiently store the event affecting program performance by determining the event to be stored dynamically conforming to the feature of the executed program. Therefore, performance analysis of the program can be efficiently conducted.

Using the address area created by the address mask 100, the performance monitor device 50 determines the event to be stored for each address area. Thus, the operator can determine the address of the instruction executed in the processor when an event occurs as well as the number of event occurrences. Therefore, performance analysis of the program can be efficiently conducted.

It is to be understood that the invention is not limited to the specific embodiment described above and that the invention can be embodied with the components modified without departing from the spirit and scope of the invention. The invention can be embodied in various forms according to appropriate combinations of the components disclosed in the embodiment described above. For example, some components may be deleted from all components shown in the embodiment. Further, the components in different embodiments may be used appropriately in combination.

What is claimed is:

1. A performance monitor device comprising:
   a feature event extraction unit connected to a processor, which executes a software program, through an event signal line, the feature event extraction unit being configured to extract one or more feature events from an event signal that is received in time series through the event signal line, the event signal configured by a plurality of bits indicating one or different types of events occurring in the processor during execution of the software program;
   a feature selection unit that:
   receives (1) at least a part of an address signal that indicates an instruction address of the software program being executed and (2) the feature events extracted by the feature event extraction unit;
   counts and updates a number of occurrences of each of the feature events corresponding to the address signal; and
   outputs one of the feature events as a feature identifier that identifies a feature of the software program;
   a stored event extraction unit that:
   receives the event signal;
   selects a plurality of stored event candidates from the events indicated in the event signal based on a plurality of internally stored event numbers; and
   outputs one of the stored event candidates as a stored event based on the feature identifier; and
   an event storage control unit that:
   receives (1) the stored event output from the stored event extraction unit and (2) the address signal received by the feature selection unit; and
   counts and updates a number of occurrences of the stored event corresponding to the address signal.

2. An information processing apparatus comprising:
   a performance monitor device according to claim 1; and
   a processor core that outputs the address signal and the event signal to the performance monitor, the processor core having a computation unit and a primary cache memory unit.

3. The information processing apparatus according to claim 2, wherein the feature selection unit counts the number of occurrences of each of the feature events in consideration of feature-by-feature weighting values that are previously set.

4. The information processing apparatus according to claim 3, wherein the feature selection unit has a feature event table for storing the number of occurrences for each of the feature events being counted corresponding to the address signal, and
   wherein the feature selection unit operates to:
   update the number of occurrences of the feature event, when the feature event is extracted by the feature event extraction unit, by adding (1) the number of occurrences of the feature event stored in the feature event table and (2) the corresponding one of the feature-by-feature weighting values; and
   update the number of occurrences of the feature event, when the feature event is not extracted by the feature event extraction unit, by decreasing the number of occurrences of the feature event.

5. The information processing apparatus according to claim 4, wherein the feature selection unit outputs the feature event having the maximum value of the numbers of occurrences in the feature event table from among the feature events specified by the address signal as the feature identifier.

6. The information processing apparatus according to claim 5, wherein the feature selection unit, when the numbers of occurrences for each of the feature events are all zero, outputs a feature event indicating exception handling as the feature identifier.

7. The information processing apparatus according to claim 3, wherein each of the feature-by-feature weighting values is previously set based on number of stalls of each of the respective feature events.

8. The information processing apparatus according to claim 2, wherein the event storage control unit has a stored event table for storing the numbers of occurrences of the stored events counted corresponding to the address signal, and
   wherein, when the stored event is extracted by the stored event extraction unit, the event storage control unit updates the number of occurrences of the stored event stored in the stored event table.

9. The information processing apparatus according to claim 8, wherein the event storage control unit is configured to set the feature identifier for each of the instruction addresses indicated by the address signal.

10. The information processing apparatus according to claim 9, the event storage control unit operates to:
   output, when the feature identifier is set in the stored event table, the feature identifier to the stored event extraction unit; and
   set, when the feature identifier is not set in the stored event table, the feature identifier from the feature selection unit in the stored event table and outputs the feature identifier to the stored event extraction unit.

11. The information processing apparatus according to claim 2 further comprising a trace buffer,
   wherein the event storage control unit outputs the number of occurrences of the stored event to the trace buffer at every predetermined timing.

12. The information processing apparatus according to claim 2, wherein the feature event extraction unit extracts the feature event by performing a logical operation on the event signal and a plurality of feature event mask values.

13. The performance monitor device according to claim 1, wherein the feature selection unit counts the number of occurrences of each of the feature events in consideration of feature-by-feature weighting values that are previously set.

14. The performance monitor device according to claim 13, wherein the feature selection unit has a feature event table for storing the number of occurrences for each of the feature events being counted corresponding to the address signal, and
   wherein the feature selection unit operates to:
   update the number of occurrences of the feature event, when the feature event is extracted by the feature event extraction unit, by adding (1) the number of occurrences of the feature event stored in the feature event table and (2) the corresponding one of the feature-by-feature weighting values; and
   update the number of occurrences of the feature event, when the feature event is not extracted by the feature event extraction unit, by decreasing the number of occurrences of the feature event.

15. The performance monitor device according to claim 14, wherein the feature selection unit outputs the feature event having the maximum value of the numbers of occurrences in the feature event table from among the feature events specified by the address signal as the feature identifier.

16. The performance monitor device according to claim 15, wherein the feature selection unit, when the numbers of occurrences for each of the feature events are all zero, outputs a feature event indicating exception handling as the feature identifier.

17. The performance monitor device according to claim 13, wherein each of the feature-by-feature weighting values is previously set based on number of stalls of each of the respective feature events.

18. The performance monitor device according to claim 1, wherein the event storage control unit has a stored event table for storing the numbers of occurrences of the stored events counted corresponding to the address signal, and
   wherein, when the stored event is extracted by the stored event extraction unit, the event storage control unit updates the number of occurrences of the stored event stored in the stored event table.

19. The performance monitor device according to claim 18, wherein the event storage control unit is configured to set the feature identifier for each of the instruction addresses indicated by the address signal.

20. The performance monitor device according to claim 19, the event storage control unit operates to:
   output, when the feature identifier is set in the stored event table, the feature identifier to the stored event extraction unit; and
   set, when the feature identifier is not set in the stored event table, the feature identifier from the feature selection unit in the stored event table and outputs the feature identifier to the stored event extraction unit.

21. The performance monitor device according to claim 1, wherein the event storage control unit outputs the number of occurrences of the stored event to an external buffer at every predetermined timing.

22. The performance monitor device according to claim 1, wherein the feature event extraction unit extracts the feature event by performing a logical operation on the event signal and a plurality of feature event mask values.

* * * * *